US012198294B2

(12) United States Patent
Trott

(10) Patent No.: US 12,198,294 B2
(45) Date of Patent: Jan. 14, 2025

(54) NEURAL NETWORK PROCESSING OF REORDERED COLOR FILTER ARRAY FORMATTED IMAGE DATA

(71) Applicant: Xilinx, Inc., San Jose, CA (US)

(72) Inventor: Karsten Trott, Olching (DE)

(73) Assignee: XLNX, INC., San Jose, CA (US)

( * ) Notice: Subject to any disclaimer, the term of this patent is extended or adjusted under 35 U.S.C. 154(b) by 501 days.

(21) Appl. No.: 17/591,425

(22) Filed: Feb. 2, 2022

(65) Prior Publication Data

US 2023/0245269 A1 Aug. 3, 2023

(51) Int. Cl.

| | |
|---|---|
| ***G06T 3/4015*** | (2024.01) |
| ***G06T 3/4038*** | (2024.01) |
| ***H04N 23/617*** | (2023.01) |
| ***H04N 23/84*** | (2023.01) |
| ***H04N 23/88*** | (2023.01) |

(52) U.S. Cl.

CPC .......... *G06T 3/4015* (2013.01); *G06T 3/4038* (2013.01); *H04N 23/617* (2023.01); *H04N 23/84* (2023.01); *H04N 23/88* (2023.01); *G06T 2207/10024* (2013.01); *G06T 2207/20081* (2013.01)

(58) Field of Classification Search

CPC .............. H04N 23/84; H04N 1/60–648; G06T 3/04028

USPC .................................................... 348/207.99

See application file for complete search history.

(56) References Cited

U.S. PATENT DOCUMENTS

| | | | | |
|---|---|---|---|---|
| 7,057,654 | B2 * | 6/2006 | Roddy | H04N 23/125 348/277 |
| 2019/0082185 | A1 * | 3/2019 | Satavalekar | H04N 19/186 |
| 2021/0158096 | A1 * | 5/2021 | Sinha | G06N 3/08 |
| 2022/0084159 | A1 * | 3/2022 | Kim | G09G 5/393 |
| 2022/0392182 | A1 * | 12/2022 | Tu | H04N 25/131 |

* cited by examiner

*Primary Examiner* — Anthony J Daniels

(74) *Attorney, Agent, or Firm* — Crawford Maunu PLLC

(57) ABSTRACT

A rearranger circuit rearranges data elements of each raw image of a plurality of raw images according to a plurality of raw color channel arrays. The data elements of each raw image are input to the rearranger circuit according to instances of a pattern of color channels of a color filter array (CFA). The data elements specify values of the color channels in the instances of the pattern, and each raw color channel array has the data elements of one color channel of the color channels in the instances of the pattern. The rearranger circuit can be used in neural network training or in generating raw color channel arrays for performing neural network inference.

20 Claims, 9 Drawing Sheets

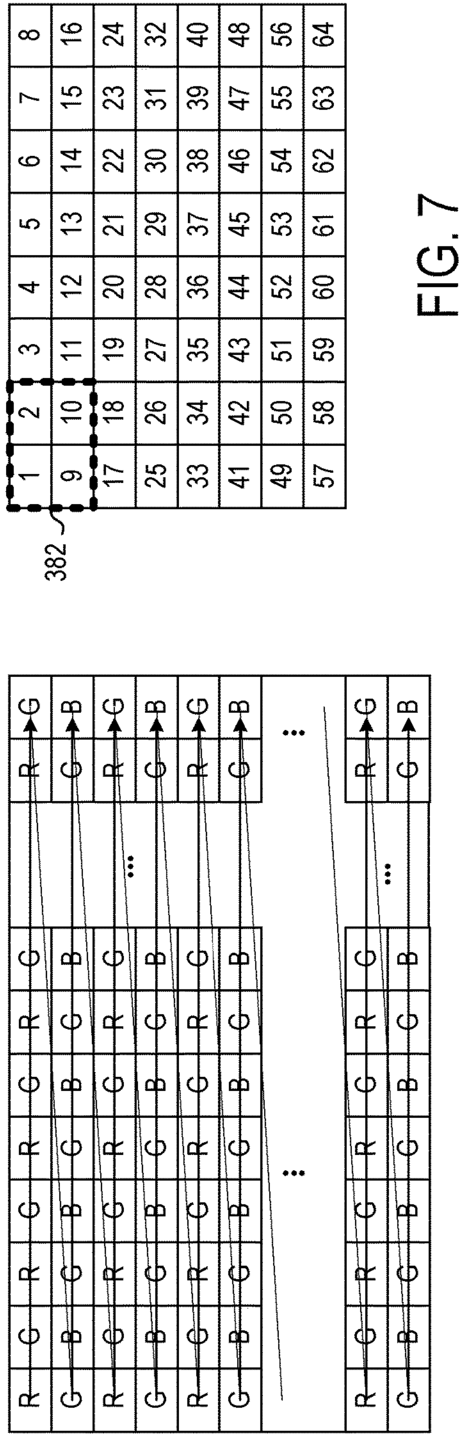
FIG. 6
FIG. 7
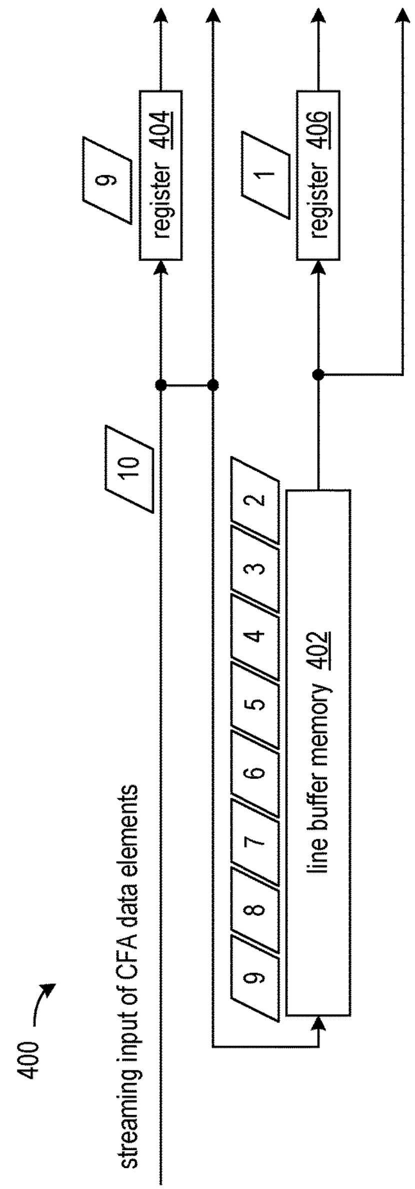
FIG. 8

NEURAL NETWORK PROCESSING OF REORDERED COLOR FILTER ARRAY FORMATTED IMAGE DATA

TECHNICAL FIELD

The disclosure generally relates to processing of image data by neural networks.

BACKGROUND

Many image recognition/classification (or "processing" for brevity) systems use "full color" images for neural network training and inference. "Full color" refers to image data that includes an individual value for each color channel for each pixel of each image, for example, red, green, and blue pixel values in an RGB color space.

Approximating during training the features of the image data that the neural network will encounter during inference can provide a better trained network. For example, if during inference the neural network will process RGB full color image data resulting from image capture, scaling, demosaicing, noise reduction, color conversion, etc., then the image data used in training should have also undergone scaling, demosaicing, noise reduction, color conversion, etc.

Developers may procure image data for training a neural network from an outside source, such as a commercial provider or the public domain. The source of the training image data may have a database of full color stock images. Providers of stock images usually provide only full color images. A developer of a neural network application can use the full color images during training or convert the full color images to raw images consistent with a color filter array, by applying the same processing that will be used during inference. Use of full color images may require at least scaling the images to a target resolution. The pre-processing can include additional processing, such as noise reduction, to improve the image quality.

SUMMARY

According to a disclosed method, a rearranger circuit rearranges data elements of each raw image of a plurality of raw images according to a plurality of raw color channel arrays. The data elements of each raw image are input to the rearranger circuit according to instances of a pattern of color channels of a color filter array (CFA). The data elements specify values of the color channels in the instances of the pattern, and each raw color channel array has the data elements of one color channel of the color channels in the instances of the pattern. The method includes training a neural network on the plurality of raw color channel arrays generated from each raw image.

According to another disclosed method, a rearranger circuit rearranges data elements of a raw image according to a plurality of raw color channel arrays. The data elements of the raw image are input to the rearranger circuit according to instances of a pattern of color channels of a color filter array (CFA). The data elements specify values of the color channels in the instances of the pattern, and each raw color channel array has the data elements of one color channel of the color channels in the instances of the pattern. The method includes running inference on the plurality of raw color channel arrays by a neural network.

A disclosed circuit arrangement includes a rearranger circuit configured to input data elements of each raw image of a plurality of raw images and to rearrange the data elements of each raw image according to a plurality of raw color channel arrays. The data elements of each raw image input to the rearranger circuit are ordered according to instances of a pattern of color channels of a color filter array (CFA). The data elements specify values of the color channels in the instances of the pattern, and each raw color channel array has the data elements of one color channel of the color channels in the instances of the pattern. The circuit arrangement includes one or more processor circuits configured to perform neural network inference on the plurality of raw color channel arrays generated from each raw image.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which:

FIG. 6 shows an example of an order in which data elements of an RGGB CFA are input;

FIG. 7 shows an example of a CFA in which the data elements are numbered in the order in which the data elements are presented for rearranging, and the pattern of the CFA is a 2×2 array;

FIG. 8 shows an exemplary circuit arrangement in which a line buffer and delay registers are used to align the 4 data elements in each instance of a 2×2 pattern for concurrent writing in the rearranging of CFA data into raw color channel arrays;

DETAILED DESCRIPTION

Figure 1:
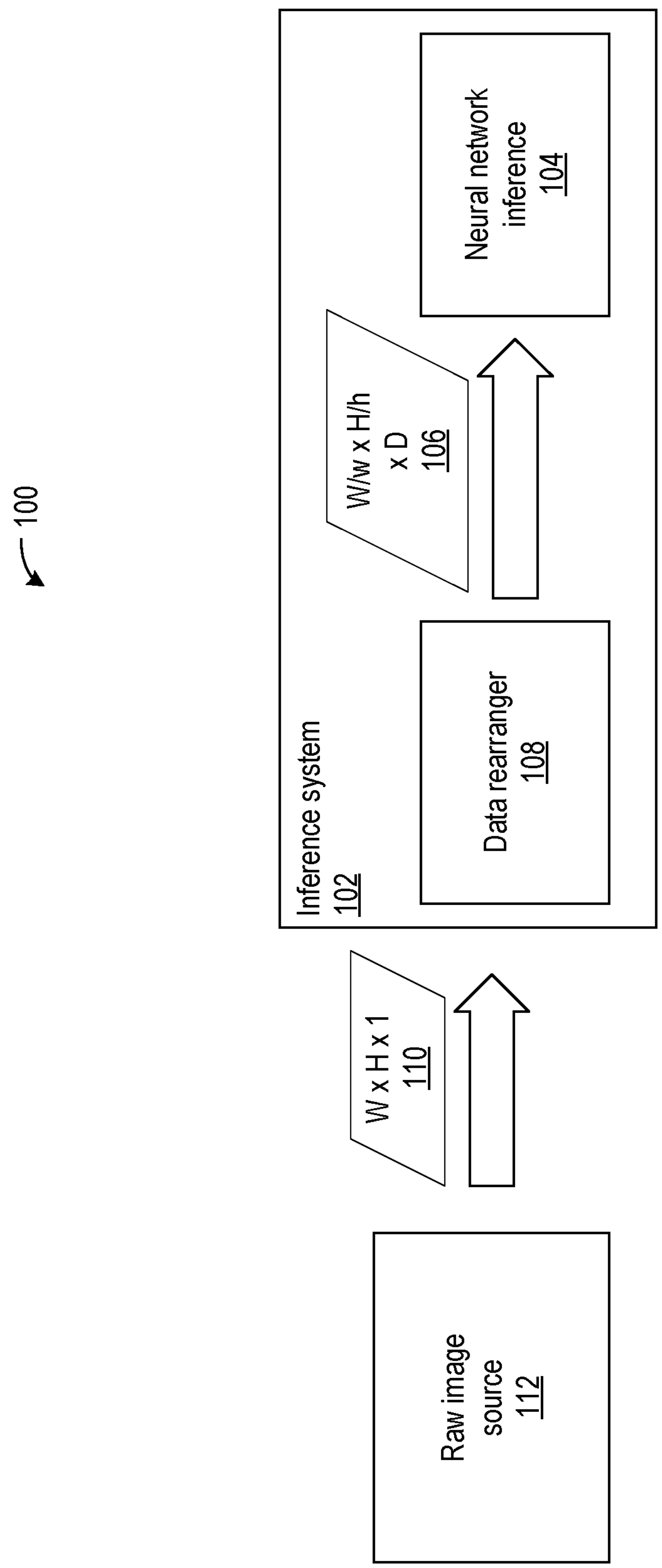
FIG. 1 shows a system configured to rearrange raw image data into raw color channel arrays and perform neural network inference processing on the raw color channel arrays.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

According to the disclosed methods and systems, raw image data is used in neural network training and inference, which avoids the preprocessing (demosaicing, noise reduction, color conversion) of image data undertaken in prior approaches. The methods and systems substantially reduce processing time and memory requirements without sacrificing accuracy.

Most imaging systems employ color filter arrays (CFAs) disposed over the image sensors. An example of a common CFA is an RGGB CFA (or "Bayer filter"). In an RGGB CFA, a 2×2 pixel area of the CFA provides 1 red pixel value, 2 green pixel values, and 1 blue pixel value. Typical applications convert the raw RGGB data into full color RGB data for neural network processing.

The disclosed methods and systems rearrange the raw image data according to raw color channel arrays for processing by a neural network, instead of converting the raw image data into full color image data for processing. For example, in an RGGB CFA, the CFA data is rearranged according to one red, two green, and one blue raw color channel arrays. Though the disclosed approaches rearrange color values and perform neural network processing according to 4 arrays for an RGGB CFA while the prior approach would involve processing of 3 arrays (1 red, 1 green, and 1 blue), the height and width of the raw color channel arrays are a fraction of the height and width of the full color arrays, which significantly reduces the total size of the raw color channel arrays as compared the total size of the full color arrays. The reduced size of the raw input image data substantially reduces the computation and memory requirements in neural network layers that follow the initial layer(s). Latency can also be reduced as pre-processing (e.g., demosaicing) of the image data is eliminated.

FIG. 1 shows a system 100 configured to rearrange raw image data into raw color channel arrays and perform neural network inference processing on the raw color channel arrays. The system can include a raw image source 112 and an inference system 102. The raw image source is an image sensor that captures raw image data produced by a CFA and provides the raw image data as output. Each raw image 110 is provided as input to the inference system 102. The inference system can include one or more of, or a combination of CPUs, GPUs, FPGAs, ASICs, ASSPs or ACAPs. The system can include a host computer system to manage over all neural network operations.

Each image 110 captured and provided by the raw image source has dimensions W×H×1 (W=width and H=height) and is input to the data rearranger circuit 108 of the inference system 102. The data elements of the raw image are input to the rearranger circuit according to the pattern of color channels of a color filter array (CFA), and the data elements specify values of the color channels in the pattern. The rearranger circuit rearranges data elements of the raw image 110 into multiple raw color channel arrays, and each raw color channel array has the data elements of one color channel of the color channels in the instances of the pattern. A "color channel" of a CFA as used herein is one of the positions within an instance of the CFA pattern. For example, a 2×2 CFA pattern has 4 color channels. Multiple data elements having respective values for the same color in a CFA pattern are referred to as separate color channels in this description. For example, the RGGB CFA pattern has two color channels for the color green. The raw color channel arrays generated by the rearranger circuit are input to the neural network inference engine 104, which can perform object recognition, for example.

The width and height of the raw color channel arrays 106 and the number of raw color channel arrays (D) depend on the dimensions of the pattern. Generally, the width of each raw color channel array is equal to the width of the raw image 110 divided by the width of the pattern (W/w), and the height of each raw color channel array is equal to the height of the raw image 110 divided by the height of the pattern (H/h). The number of raw color image arrays (or depth of the image, D) is equal to the product of the width and height of the pattern (w*h).

Figure 2:
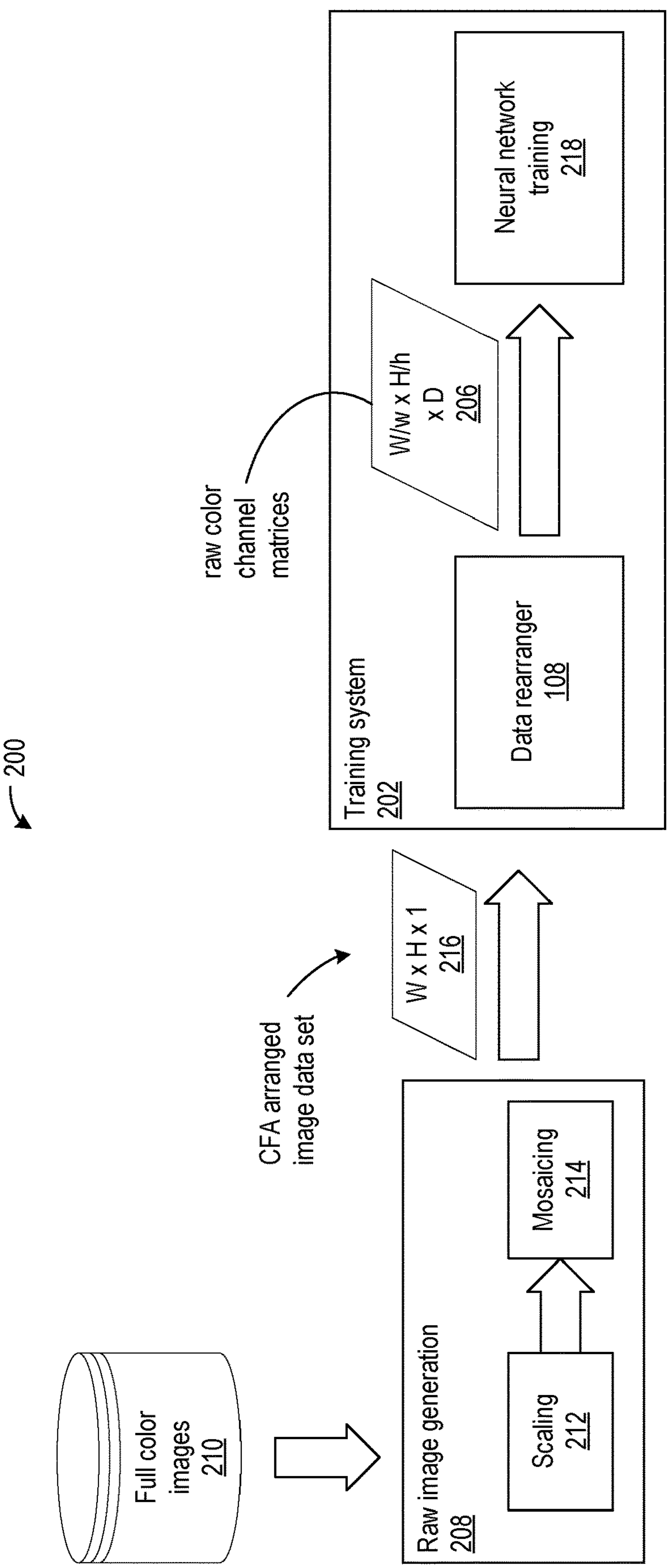
FIG. 2 shows a system configured to train a neural network using raw color channel arrays that are generated from raw image data.

FIG. 2 shows a system 200 configured to train a neural network using raw color channel arrays that are generated from raw image data. The system can also include components for use in training a neural network using raw color channel arrays derived from a library of full color images, which may be more readily available than a library of raw images.

The system can include a training system 202 and a source of raw image data. The source of raw image data can be a raw image generation system 208 that reads full color images from a database 210 of full color images and converts each full color image into a raw color image (CFA format). Each raw image 216 is provided as input to the training system 202. The training system and raw image generation system can include one or more of, or a combination of CPUs, GPUs, FPGAs, ASICs, ASSPs or ACAPs. The systems can include a host computer system to manage over all neural network operations.

The raw image generation system 208 reads full color images from the database 210, scales 212 each image, and mosaics 214 the scaled, full color image into a raw image 216 consistent with a particular CFA format.

The data elements of the raw image are input to the rearranger circuit 108 of the training system 202 according to the pattern of color channels of the CFA, and the data elements specify values of the color channels in the pattern. The rearranger circuit rearranges data elements of the raw image 216 into multiple raw color channel arrays 206, and each raw color channel array has the data elements of one color channel of the color channels in the instances of the pattern. The raw color channel arrays generated by the rearranger circuit are input to the neural network training engine 218, which can perform object recognition, for example.

Figure 3:
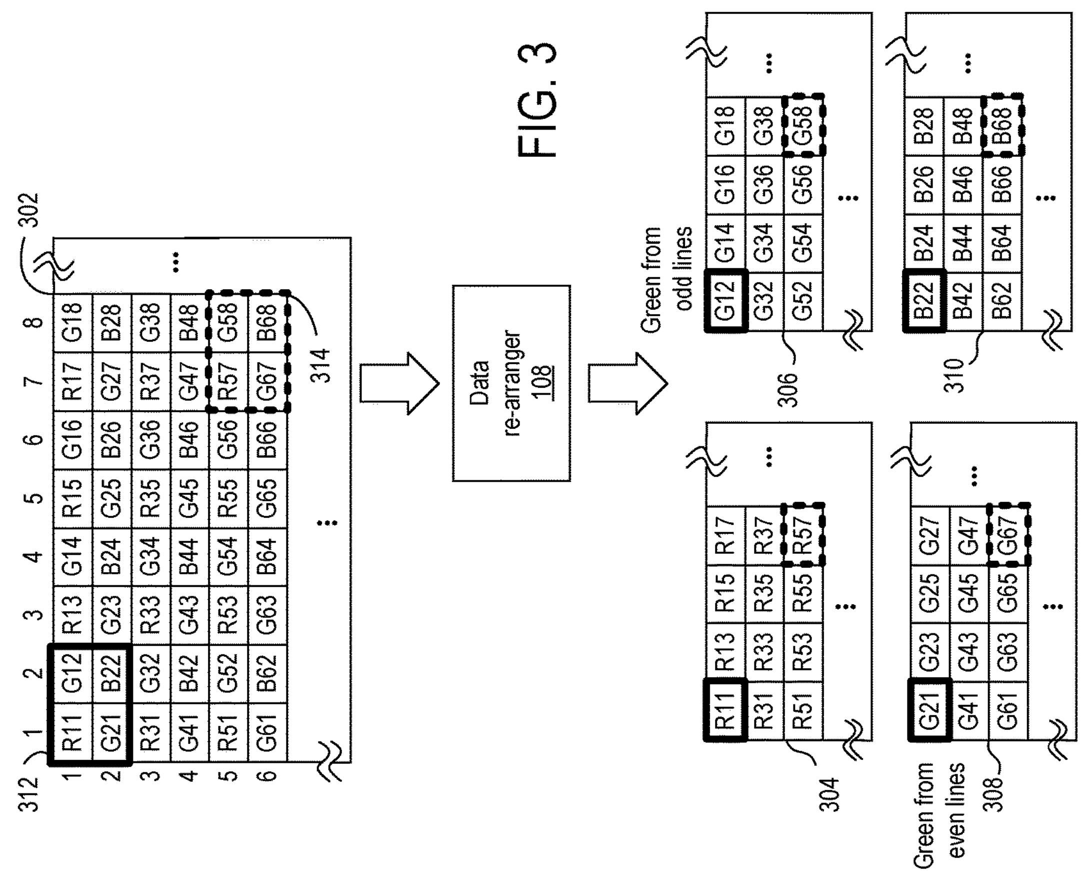
FIG. 3 shows an example in which an array of raw image data in an RGGB CFA format are rearranged into a red raw color channel array, two green raw color channel arrays, and a blue raw color channel array.

FIG. 3 shows an example in which an array 302 of raw image data in an RGGB CFA format are rearranged into a red raw color channel array 304, two green raw color channel arrays 306 and 308, and a blue raw color channel array 310. The CFA 302 has W columns and H rows.

Each element in the array is identified by a color character (R, G, or B) and a number that indicates the row and column indices of the element. For example, the element labeled "B24" in the array indicates a blue value in row 2, column 4 of the array.

The RGGB pattern is a 2×2 pattern, and instances of the pattern comprise the CFA. The bold block 312 is an example of one instance of the pattern, the horizontally adjacent next instance of the pattern encompasses elements R13, G14, G23, and B24. The bold dashed block 314 is another instance of the pattern.

The rearranger circuit 108 inputs the raw image data arranged according to the CFA 302 and generates four raw color channel arrays 304 306, 308, and 310, one array for each element in the pattern.

The red elements in the instances of the pattern are stored as raw color channel array 304, the green elements in odd numbered CFA lines in the instances of the pattern are stored as raw color channel array 306, the green elements in even numbered CFA lines in the instances of the pattern are stored as raw color channel array 308, and blue elements in the instances of the pattern are stored as raw color channel array 310.

In the example, the identifiers of the data elements in the CFA 302 are carried over into the raw color channel arrays in order to illustrate the mapping of the CFA elements to positions in the raw color channel arrays. To further illustrate, the bold blocks in the raw color channel arrays correspond to the data elements of instances 312 and 314 of the CFA.

Figure 4:
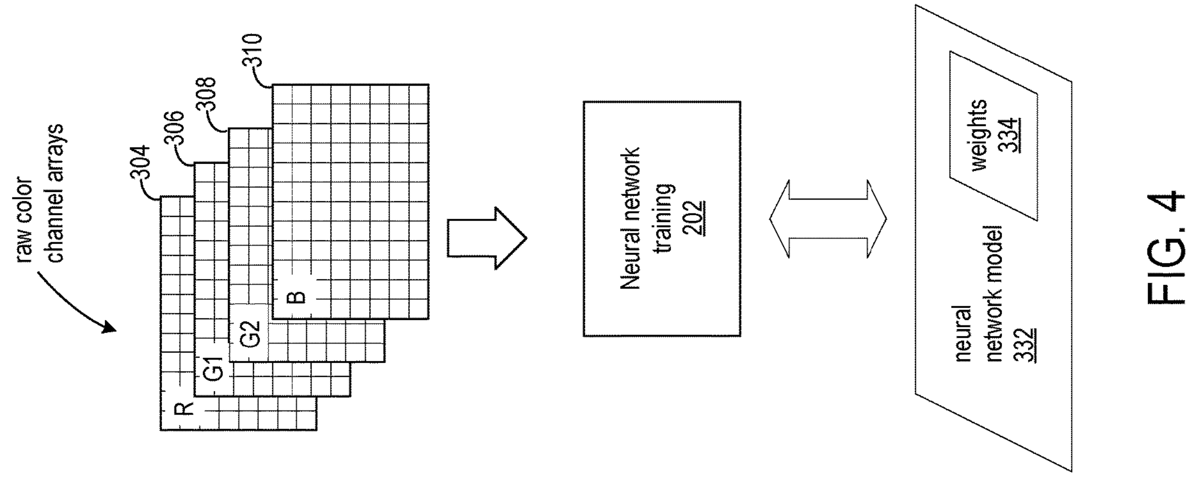
FIG. 4 shows an example in which the red, two green and blue raw color channel arrays generated from an RGGB CFA are input to train a neural network.

FIG. 4 shows an example in which the red, two green and blue raw color channel arrays 304, 306, 308, and 310 generated from an RGGB CFA 302 (FIG. 3) are input to train a neural network. The set of raw color arrays represent an image and are input to the neural network training system 202. With each input set of raw color arrays, the neural network training system performs feedforward processing and back propagation, adjusting the weights 334 of the neural network model 332 accordingly.

Though a RGGB CFA is used in the examples shown and described herein, the disclosed approaches can be applied to current CFAs and CFAs developed in the future. For example, the rearranger circuit can be configured to generate raw color channel arrays from RBG-IR (a 2×2 pattern and IR=near infra-red), RGBE (a 2×2 pattern and E=emerald), RYYB (a 2×2 pattern and Y=yellow), CYYM (a 2×2 pattern and C=cyan, M=magenta), CYGM (a 2×2 pattern), RGBW (a 2×4 or 4×4 pattern and W=white), RCCC (a 2×2 pattern and C=clear), and RCCB (a 2×2 pattern and C=clear) CFAs.

Figure 5:
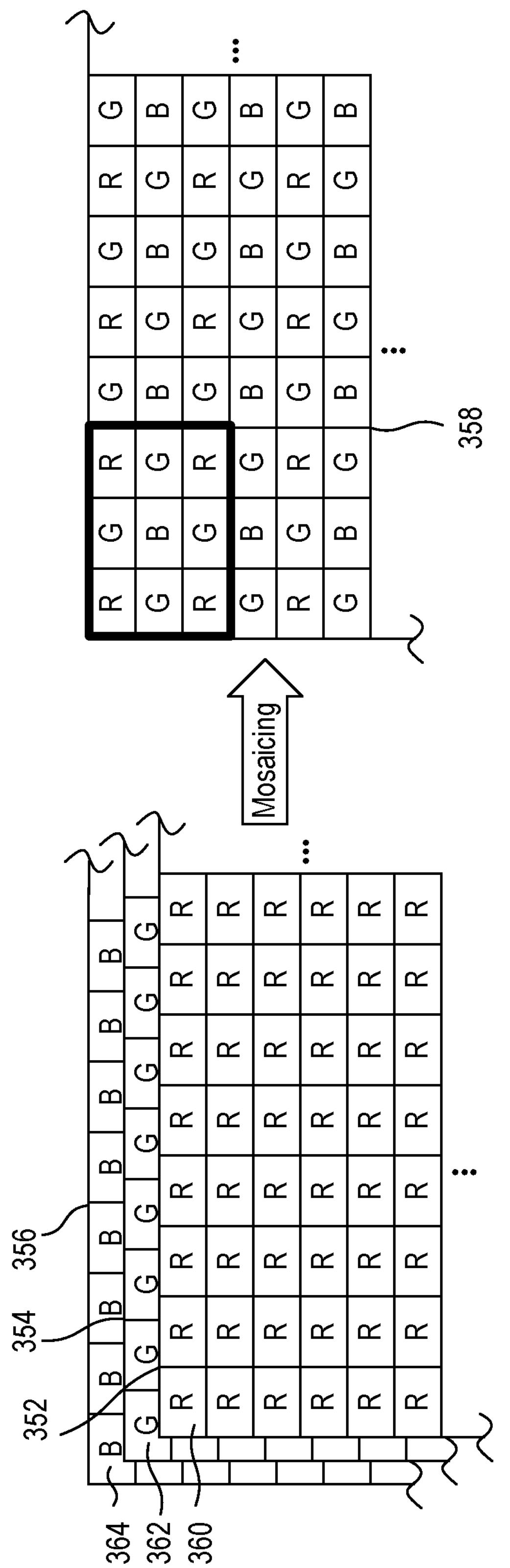
FIG. 5 shows an example of mosaicing RBG full color image data into an RGGB CFA format.

FIG. 5 shows an example of mosaicing RBG full color image data into an RGGB CFA format. The mosaicing process can be employed in applications in which the training set of images has full color images, and the neural network is trained using raw color channel arrays as described herein.

The exemplary full color image data is comprised of three arrays, an array 352 of red values, an array 354 of green values, and an array 356 of blue values. The red, green and blue values at each corresponding position in the arrays represent one pixel of a full color image.

The mosaicing process may be understood by first understanding demosaicing. In systems having an image sensor and CFA that outputs raw image data according to the CFA pattern, demosaicing is performed on the raw image data to generate full color image data, such as for displaying the image. In demosaicing CFA data, the values in each instance of the CFA pattern are processed by color to generate the color values for one pixel of the full color image.

For example, according to one approach for demosaicing an RGGB CFA, which has a 2×2 pattern of one red, two green, and one blue values, the red, green, and blue values for each pixel of the full color image can be computed from a 3×3 window on the CFA values. In the example, the red pixel 360 can be computed from the red values in the 3×3 window 364, the green pixel 362 can be computed from the green values in the 3×3 window 364, and the blue pixel 364 can be computed from the blue values in the 3×3 window 364. The value of the red pixel 360 can be computed as the mean of the red values in the window 364 (sum of the red values in the window 364 divided by 4), the value of the green pixel 362 can be computed as the mean of the green values in the window (sum of the green values in the window divided by 4), and the value of the blue pixel can be the value of the one blue value in the window. The 3×3 window can be moved one position to the right on the CFA to compute the red, green, and blue values of the next pixel to the right in the full color image based on averages of the color values in the windows.

The mosaicing process performs the inverse of demosaicing to generate RGGB CFA format 358 and can be implemented using recognized algorithms.

FIGS. 6, 7, and 8 illustrate how CFA data can be aligned for storing as raw color filter arrays.

FIG. 6 shows an example of an order in which data elements of an RGGB CFA are input. According to one example, the data elements from a CFA can be input proceeding sequentially across the elements in each row (e.g., from left to right) and proceeding to the first element of the next sequential row after the last element of a row has been input. Depending on the size of the data channel and size of the data elements, the elements can be input 1, 2, 4, or 8 at a time.

As the 2×2 RGGB pattern spans two rows and the data elements are input in the order illustrated in FIG. 6, more than row of CFA data elements must be input if the writes of the 4 data elements are to be concurrent to the corresponding positions in the 4 raw color channel arrays.

FIG. 7 shows an example of a CFA in which the data elements are numbered in the order in which the data elements are presented for rearranging, and the pattern of the CFA is a 2×2 array.

Dashed block 382 shows an instance of the pattern of the CFA and includes elements numbered 1, 2, 9, and 10. In an RGGB CFA, the element 1 can be a red value, elements 2 and 9 can be green values, and element 10 can be a blue value, for example. The rearranger circuit writes the elements 1, 2, 9, and 10 to corresponding positions in four raw color arrays. In the next write cycle, rearranger circuit writes the elements 3, 4, 11, and 12 to the next corresponding positions in the four raw color arrays.

FIG. 8 shows an exemplary circuit arrangement 400 in which a line buffer and delay registers are used to align the 4 data elements in each instance of a 2×2 pattern for concurrent writing in the rearranging of CFA data into raw color channel arrays. The circuit arrangement includes a line buffer memory 402 and registers 404 and 406 for buffering input CFA data elements and making the elements of each instance of the CFA pattern available for concurrent writing.

The line buffer memory is sized according to the number of columns in the exemplary CFA of FIG. 7, and the example shows a snapshot of the buffering of the numbered CFA data elements. The data elements are input in numbered order beginning with element number 1.

The data elements are shifted from left to right in the line buffer memory 402, either logically through addressing or physically shifting. Once data element 1 has been shifted out of line buffer memory 402 and into register 406, all 4 data elements of the instance 382 are available to be concurrently written to corresponding positions of the 4 raw color channel arrays. That is, data element 1 is available as output from the register 406, data element 2 is available to read out from the line buffer memory, data element 9 is available as output from register 404, and data element 10 is available on the input line.

For the exemplary 2×2 CFA pattern, the rearranger circuit concurrently outputs four values per x-y coordinate pair of the raw color channel arrays (for a 2×2 pattern). The 4 data values having the same x-y coordinate pair can be written as a unit (e.g., one transaction) to memory.

The number of line buffers and registers can be tailored according to the pattern size of the CFA. For a pattern having m rows and n columns, the rearranger circuit can be configured to include m−1 line buffers. Each line buffer can buffer N data elements, where N is the number of columns in the CFA.

The registers can be arranged as m pipelines of registers in which each pipeline has n−1 registers. In the example of FIGS. 7 and 8, the CFA pattern is 2×2 and the CFA has 8 columns. One line buffer memory 402 buffers the values of 8 elements, and each pipeline of two pipelines is one register deep.

The circuit arrangement 400 can be implemented in field programmable logic (FPGA), as an application specific integrated circuit (ASIC), or an application specific standard part (ASSP), for example. Alternatively, the same functionality can be implemented as software executing on a CPU, GPU, or other processor.

In an FPGA implementation, the line buffer can be implemented by dual-ported memory block, which allows the line buffer to be clocked at the frequency of input pixel clock. Alternatively, in an ASIC or ASSP implementation the line buffer can be implemented by a single port memory, which would necessitate clocking the memory at twice the frequency of the input pixel clock.

Figure 9:
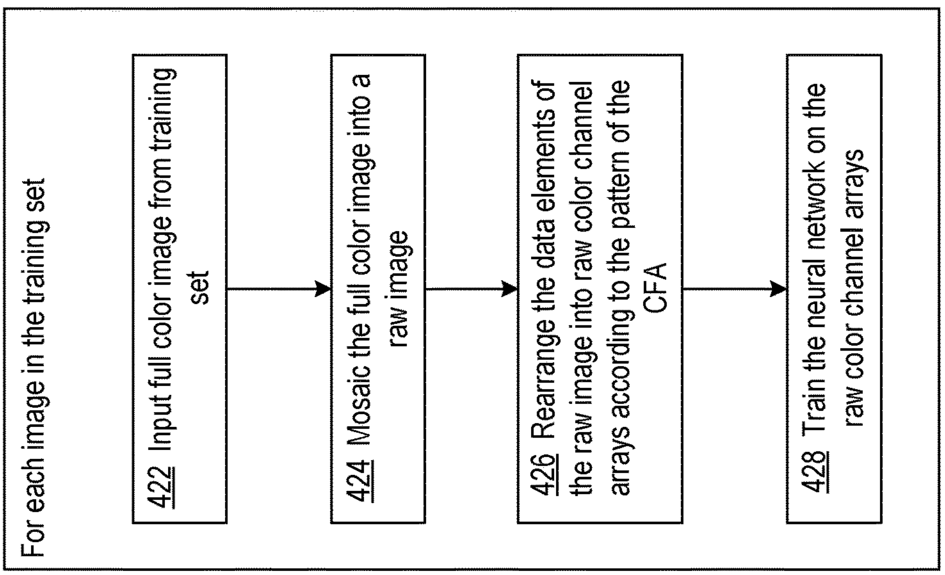
FIG. 9 shows a flowchart of an exemplary process of training a neural network using raw color channel arrays having image data rearranged from a CFA format.

FIG. 9 shows a flowchart of an exemplary process of training a neural network using raw color channel arrays having image data rearranged from a CFA format.

The process of FIG. 9 can be performed for each full color image in a training set. At block 422, a full color image is input to a raw image generation system, and at block 424, the raw image generation system performs mosaicing on the full color image data to generate a raw image in a CFA format.

At block 426, the raw image generation system rearranges the data elements of the CFA formatted raw image into raw color channel arrays, and at block 428 the raw color channel arrays are input to the neural network training engine 218.

Figure 10:
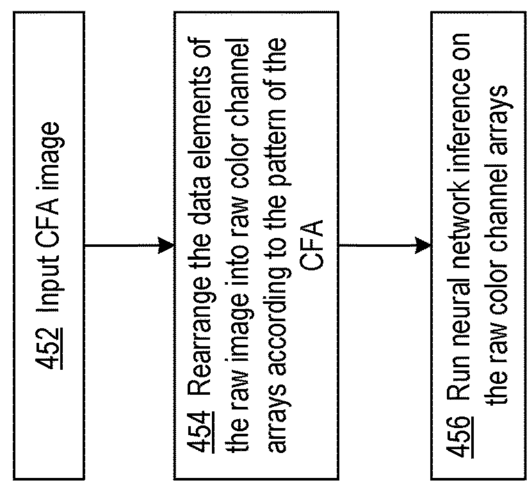
FIG. 10 shows a flowchart of an exemplary process of running inference on raw color channel arrays having image data rearranged from a CFA raw image, such as provided by a CFA sensor.

FIG. 10 shows a flowchart of an exemplary process of running inference on raw color channel arrays having image data rearranged from a CFA raw image, such as provided by a CFA sensor. At block 452, a raw CFA image is input to the rearranger circuit, and at block 454, the rearranger circuit rearranges the data elements of the CFA image into raw color channel arrays. At block 456, the raw color channel arrays are input to the neural network inference engine for inference processing.

Figure 11:
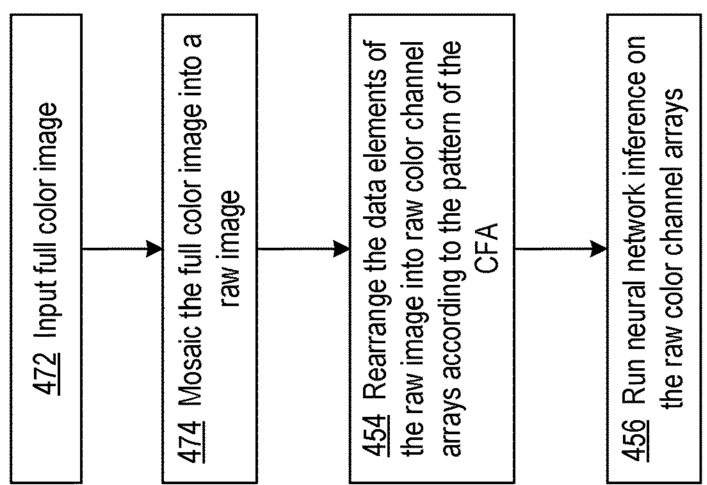
FIG. 11 shows a flowchart of a variation on the process of FIG. 10.

FIG. 11 shows a flowchart of a variation on the process of FIG. 10. Some imaging systems employ full color image sensors (e.g., RGB) that generate for each pixel a color value for each color channel (e.g., a red value, a green value, and a blue value). The disclosed approaches can be used to process the full color images into raw color channel arrays for inference processing. Though some loss of resolution and accuracy may result, the loss may be acceptable in view of the reduction in computation and memory resources accompanying the disclosed approaches.

At block 472, a full color image is input to a raw image generation system, and at block 474, the raw image generation system performs mosaicing on the full color image to generate a CFA raw image. The processing of blocks 454 and 456 are as described in FIG. 10.

Figure 12:
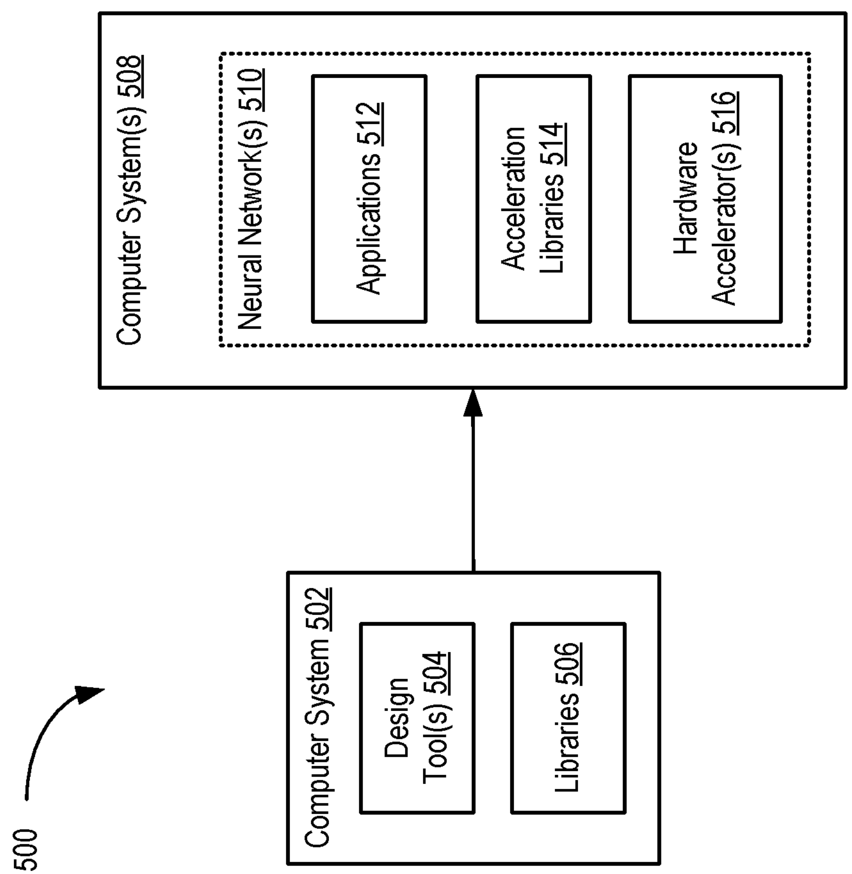
FIG. 12 is a block diagram depicting a system for implementing neural network models including neural networks according to an example.

FIG. 12 is a block diagram depicting a system 500 for implementing neural network models including neural networks according to an example. The system 500 includes a computer system 502 and one or more computer systems 508. The computer system 502 includes conventional computing components configured to execute software that provides one or more design tools 504. Each computer system 508 implements one or more neural networks 510. The neural network(s) 510 are implemented using applications 512, acceleration libraries 514, and one or more hardware accelerators 516.

In an example, the hardware accelerator(s) 516 include programmable integrated circuits (ICs), such as field programmable gate arrays (FPGAs). The acceleration libraries 514 provide application programming interfaces (APIs) to interface with the hardware accelerator(s) 516. The acceleration libraries 514 can also include libraries that provide neural network functions, including predefined and optimized implementations of neural network layers and other types of neural network structures. Thus, the neural network(s) 510 can include both hardware portions implemented in the hardware accelerator(s) 516, as well as software portions implemented in the acceleration libraries 514. The applications 512 invoke the APIs of the acceleration libraries 514 to program and control the hardware accelerator(s) 516 to implement the neural network(s) 516.

A designer interacts with the design tool(s) 504 to define the neural network(s) 510. The design tool(s) 504 can generate files for programming the hardware accelerator(s) 516 (e.g., configuration bitstreams for FPGAs), files that provide the acceleration libraries 514, and files that provide the applications 512. The designer can define the hardware portions of the neural network(s) 510 using a register transfer language (RTL) or using a programming language, such as C, C++, OpenCL, and the like, or a combination of RTL and programmable language(s). The user can define the software portions of the neural network(s) 510 using a programming language, such as C, C++, OpenCL, etc. The design tool(s) 504 compile the software-defined neural networks to generate files for programming the hardware accelerator(s) 516 and library files for the acceleration libraries 514. The designer can make use of libraries 506 that provide class libraries, template libraries, and the like to assist in developing the hardware and software portions of the neural network(s) 510.

A user can define the applications 512 using a programming language (e.g., C, C++, Python, etc.). The user can make use of neural network frameworks and libraries, such as Caffe, TensorFlow™, Pytorch, MXNet, and the like.

Figure 13:
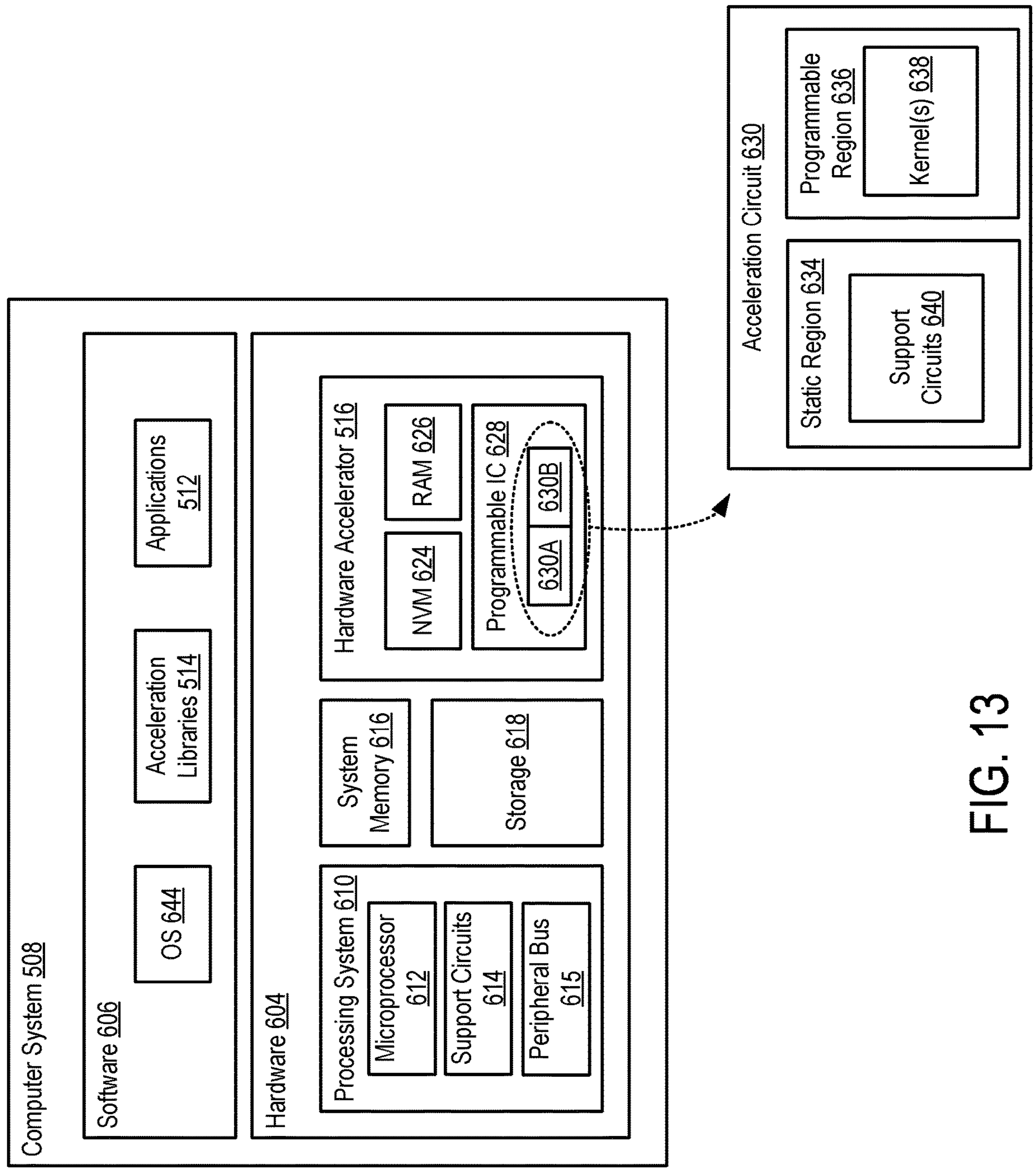
FIG. 13 is a block diagram depicting a computing system according to an example.

FIG. 13 is a block diagram depicting a computing system 508 according to an example. The computing system 508 includes hardware 604 and software 606 executing on the hardware 604. The hardware 604 includes a processing system 610, system memory 616, storage device(s) ("storage 618"), and a hardware accelerator 516 (or "neural network accelerator"). The software 606 includes an operating system (OS) 644, the acceleration libraries 514, and the applications 512. The processing system 610, system memory 616, and storage 618 comprise a host computer system as referenced herein.

The processing system 610 includes a microprocessor 612, support circuits 614, and a peripheral bus 615. The microprocessor 612 can be any type of general-purpose central processing unit (CPU), such as an x86-based processor, ARM®)-based processor, or the like. The microprocessor 612 can include one or more cores and associated circuitry (e.g., cache memories, memory management units (MMUs), interrupt controllers, etc.). The microprocessor 612 is configured to execute program code that perform one or more operations described herein and which can be stored in the system memory 616 and/or the storage 618. The support circuits 614 include various devices that cooperate with the microprocessor 612 to manage data flow between the microprocessor 612, the system memory 616, the storage 618, the hardware accelerator 516, or any other peripheral device. For example, the support circuits 614 can include a chipset (e.g., a north bridge, south bridge, platform host controller, etc.), voltage regulators, firmware (e.g., a BIOS), and the like. The support circuits 614 manage data flow between the microprocessor 612 and the peripheral bus 615, to which various peripherals, such as the hardware accelerator 516, are connected. In some examples, the microprocessor 612 can be a System-in-Package (SiP), System-on-Chip (SoC), or assume a Chiplet architecture or the like, which absorbs all or a substantial portion of the functionality of the chipset (e.g., north bridge, south bridge, etc.). The peripheral bus 615 can implement an expansion bus standard, such as Peripheral Component Interconnect Express (PCIe). In the example, the processing system 610 is shown separate from the hardware accelerator 516. In other examples discussed further below, the processing system 610 and the hardware accelerator 516 can be implemented on the same integrated circuit (IC) using a System-On-Chip (SoC).

The system memory 616 is a device allowing information, such as executable instructions and data, to be stored and retrieved. The system memory 616 can include, for example, one or more random access memory (RAM) modules, such as double-data rate (DDR) dynamic RAM (DRAM). The storage device 618 includes local storage devices (e.g., one or more hard disks, flash memory modules, solid state disks, and optical disks) and/or a storage interface that enables the computing system 508 to communicate with one or more network data storage systems. The hardware 604 can include various other conventional devices and peripherals of a computing system, such as graphics cards, universal serial bus (USB) interfaces, and the like.

The hardware accelerator 516 includes a programmable IC 628, a non-volatile memory (NVM) 624, and RAM 626. The programmable IC 628 can be an FPGA or the like or an SoC having an FPGA or the like. The NVM 624 can include any type of non-volatile memory, such as flash memory or the like. The RAM 626 can include DDR DRAM or the like. The programmable IC 628 is coupled to the NVM 624 and the RAM 626. The programmable IC 628 is also coupled to the peripheral bus 615 of the processing system 610.

The OS 644 can be any commodity operating system known in the art, such as Linux®, Microsoft Windows®, Mac OS®, or the like or an embedded real-time operating system (e.g., AUTOSAR or QNX). The acceleration libraries 514 includes drivers and libraries that provide APIs for command and control of the hardware accelerator 516. The applications 512 include software executing on the microprocessor 612 that invokes the APIs of the acceleration libraries 514 to implement neural network(s).

In operation, the programmable IC 628 is configured with an acceleration circuit 630. The acceleration circuit 630 generally includes a base platform 630A and a neural network accelerator 630B. For example, the acceleration circuit 630 can be implemented using a static region 634 and a programmable region 636. The static region 634 includes support circuits 640 for providing an interface to the peripheral bus 615, the NVM 624, and the RAM 626. The programmable region 636 can include one or more neural network accelerators ("kernel(s) 638"). The base platform 630A is implemented using the static region 634, and the neural network accelerator 630B is implemented using the programmable region 636. In another example, the base platform 630A can also be implemented using a portion of the programmable region 636. Thus, in some examples, the programmable region 636 also includes some interface circuits. In some examples, the acceleration circuit 630 can include more than one programmable region 636, each of which can be individually configured with neural network accelerator(s) 638.

Figure 14:
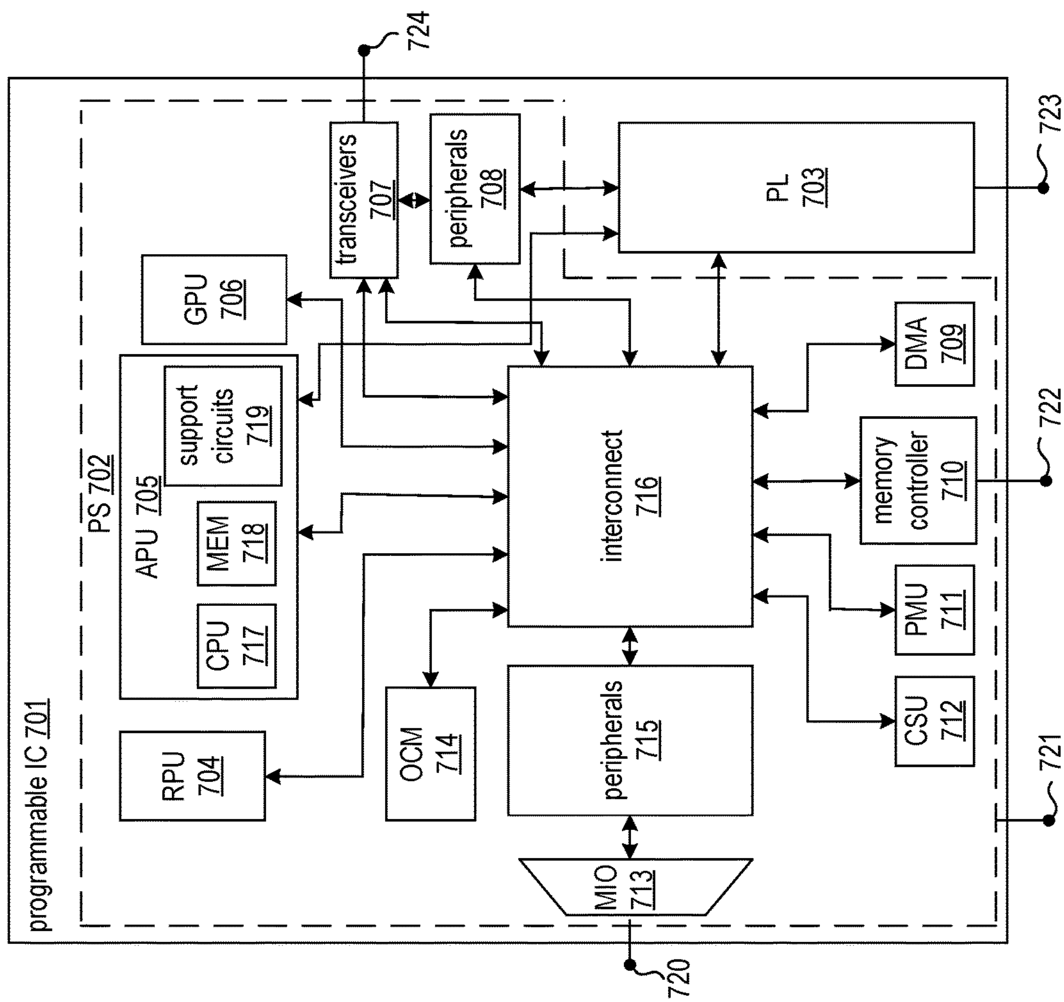
FIG. 14 is a block diagram depicting an exemplary System-on-Chip (SoC) that can host the calibrator circuit and neural network accelerator.

FIG. 14 is a block diagram depicting an exemplary System-on-Chip (SoC) 701 that can host the calibrator circuit and neural network accelerator. In the example, the SoC includes the processing subsystem (PS) 702 and the programmable logic subsystem 703. The processing subsystem 702 includes various processing units, such as a real-time processing unit (RPU) 704, an application processing unit (APU) 705, a graphics processing unit (GPU) 706, a configuration and security unit (CSU) 712, and a platform management unit (PMU) 711. The PS 702 also includes various support circuits, such as on-chip memory (OCM) 714, transceivers 707, peripherals 708, interconnect 716, DMA circuit 709, memory controller 710, peripherals 715, and multiplexed (MIO) circuit 713. The processing units and the support circuits are interconnected by the interconnect 716. The PL subsystem 703 is also coupled to the interconnect 716. The transceivers 707 are coupled to external pins 724. The PL 703 is coupled to external pins 723. The memory controller 710 is coupled to external pins 722. The MIO 713 is coupled to external pins 720. The PS 702 is generally coupled to external pins 721. The APU 705 can include a CPU 717, memory 718, and support circuits 719. The APU 705 can include other circuitry, including L1 and L2 caches and the like. The RPU 704 can include additional circuitry, such as L1 caches and the like. The interconnect 716 can include cache-coherent interconnect or the like.

Referring to the PS 702, each of the processing units includes one or more central processing units (CPUs) and associated circuits, such as memories, interrupt controllers, direct memory access (DMA) controllers, memory management units (MMUs), floating point units (FPUs), and the like. The interconnect 716 includes various switches, busses, communication links, and the like configured to interconnect the processing units, as well as interconnect the other components in the PS 702 to the processing units.

The OCM 714 includes one or more RAM modules, which can be distributed throughout the PS 702. For example, the OCM 714 can include battery backed RAM (BBRAM), tightly coupled memory (TCM), and the like. The memory controller 710 can include a DRAM interface for accessing external DRAM. The peripherals 708, 715 can include one or more components that provide an interface to the PS 702. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, PCIe ports, and the like. The peripherals 715 can be coupled to the MIO 713. The peripherals 708 can be coupled to the transceivers 707. The transceivers 707 can include serializer/deserializer (SERDES) circuits, MGTs, and the like.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for processing image data and performing neural network training and inference. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:

converting a plurality of full color images into a plurality of raw images by raw image generation circuitry, respectively, wherein each full color image is represented by a plurality of pixels, and each pixel is defined by a plurality of color values;

rearranging, by a rearranger circuit, data elements of each raw image of the plurality of raw images into a plurality of raw color channel arrays, wherein: the data elements of each raw image are ordered according to instances of a pattern of color channels of a color filter array (CFA); the data elements of each raw image specify values of the color channels in the instances of the pattern; and each raw color channel array has data elements of one color channel of the color channels in the instances of the pattern; and training a neural network on the plurality of raw color channel arrays generated from each raw image.

2. The method of claim 1, wherein the converting includes:

reading the plurality of full color images from a database; and mosaicing the plurality of pixels of each full color image into one of the plurality of raw images.

3. The method of claim 2, wherein:

the plurality of color values includes a red color value, a green color value, and a blue color value; and the mosaicing includes generating instances of a red-green-green-blue pattern.

4. The method of claim 1, wherein the plurality of raw color channel arrays includes first, second, third, and fourth raw color channel arrays, and the rearranging includes:

arranging, in the first raw color channel array, data elements corresponding to a red color channel in the instances of the pattern;

arranging, in the second raw color channel array, data elements corresponding to a first green color channel in the instances of the pattern;

arranging, in the third raw color channel array, data elements corresponding to a second green color channel in the instances of the pattern; and arranging, in the fourth raw color channel array, data elements corresponding to a blue color channel in the instances of the pattern.

5. The method of claim 1, wherein:

the data elements of each raw image are organized by rows and columns of the CFA; and the rearranging includes buffering data elements of rows i and i+1 in a line buffer memory and registers, making all data elements of each instance of the pattern concurrently available to be written to a memory as the plurality of raw color channel arrays.

6. The method of claim 5, wherein the buffering includes buffering the data elements of each raw image in a dual-ported memory.

7. The method of claim 1, wherein the plurality of raw color channel arrays includes first, second, third, and fourth raw color channel arrays, and the rearranging includes:

arranging, in the first raw color channel array, data elements corresponding to a red color channel in the instances of the pattern;

arranging, in the second raw color channel array, data elements corresponding to a blue color channel in the instances of the pattern;

arranging, in the third raw color channel array, data elements corresponding to a green color channel in the instances of the pattern; and arranging, in the fourth raw color channel array, data elements corresponding to a near-infrared color channel in the instances of the pattern.

8. The method of claim 1, wherein the plurality of raw color channel arrays includes first, second, third, and fourth raw color channel arrays, and the rearranging includes:

arranging, in the first raw color channel array, data elements corresponding to a red color channel in the instances of the pattern;

arranging, in the second raw color channel array, data elements corresponding to a blue color channel in the instances of the pattern;

arranging, in the third raw color channel array, data elements corresponding to a green color channel in the instances of the pattern; and arranging, in the fourth raw color channel array, data elements corresponding to an emerald color channel in the instances of the pattern.

9. The method of claim 1, wherein the plurality of raw color channel arrays includes first, second, third, and fourth raw color channel arrays, and the rearranging includes:

arranging, in the first raw color channel array, data elements corresponding to a red color channel in the instances of the pattern;

arranging, in the second raw color channel array, data elements corresponding to a first clear color channel in the instances of the pattern;

arranging, in the third raw color channel array, data elements corresponding to a second clear color channel in the instances of the pattern; and arranging, in the fourth raw color channel array, data elements corresponding to a blue color channel in the instances of the pattern.

10. The method of claim 1, wherein the plurality of raw color channel arrays includes first, second, third, and fourth raw color channel arrays, and the rearranging includes:

arranging, in the first raw color channel array, data elements corresponding to a red color channel in the instances of the pattern;

arranging, in the second raw color channel array, data elements corresponding to a first clear color channel in the instances of the pattern;

arranging, in the third raw color channel array, data elements corresponding to a second clear color channel in the instances of the pattern; and arranging, in the fourth raw color channel array, data elements corresponding to a third clear color channel in the instances of the pattern.

11. A method comprising:

converting a full color image into a raw image, wherein the full color image is represented by a plurality of pixels, and each pixel is defined by a plurality of color values;

rearranging, by a rearranger circuit, data elements of the raw image into a plurality of raw color channel arrays, wherein; the data elements of the raw image are ordered according to instances of a pattern of color channels of a color filter array (CFA); the data elements of the raw image specify values of the color channels in the instances of the pattern; and each raw color channel array has data elements of one color channel of the color channels in the instances of the pattern; and running inference on the plurality of raw color channel arrays by a neural network.

12. The method of claim 11, wherein the converting includes mosaicing the plurality of pixels of the full color image into the raw image by a mosaicing circuit.

13. The method of claim 12, wherein:

the plurality of color values includes a red color value, a green color value, and a blue color value; and the mosaicing includes generating instances of a red-green-green-blue pattern.

14. The method of claim 11, wherein the plurality of raw color channel arrays includes first, second, third, and fourth raw color channel arrays, and the rearranging includes:

arranging, in the first raw color channel array, data elements corresponding to a red color channel in the instances of the pattern;

arranging, in the second raw color channel array, data elements corresponding to a first green color channel in the instances of the pattern;

arranging, in the third raw color channel array, data elements corresponding to a second green color channel in the instances of the pattern; and arranging, in the fourth raw color channel array, data elements corresponding to a blue color channel in the instances of the pattern.

15. The method of claim 11, wherein:

the data elements of the raw image are organized by rows and columns of the CFA;

the rearranging includes buffering data elements of rows i and i+1 in a line buffer memory and registers, making all data elements of each instance of the pattern concurrently available to be written to a memory as the plurality of raw color channel arrays; and the buffering includes buffering the data elements of the raw image in a dual-ported memory.

16. The method of claim 11, wherein the plurality of raw color channel arrays includes first, second, third, and fourth raw color channel arrays, and the rearranging includes:

arranging, in the first raw color channel array, data elements corresponding to a red color channel in the instances of the pattern;

arranging, in the second raw color channel array, data elements corresponding to a blue color channel in the instances of the pattern;

arranging, in the third raw color channel array, data elements corresponding to a green color channel in the instances of the pattern; and arranging, in the fourth raw color channel array, data elements corresponding to a near-infrared color channel in the instances of the pattern.

17. The method of claim 11, wherein the plurality of raw color channel arrays includes first, second, third, and fourth raw color channel arrays, and the rearranging includes:

arranging, in the first raw color channel array, data elements corresponding to a red color channel in the instances of the pattern;

arranging, in the second raw color channel array, data elements corresponding to a first clear color channel in the instances of the pattern;

arranging, in the third raw color channel array, data elements corresponding to a second clear color channel in the instances of the pattern; and arranging, in the fourth raw color channel array, data elements corresponding to a blue color channel in the instances of the pattern.

18. The method of claim 11, wherein the plurality of raw color channel arrays includes first, second, third, and fourth raw color channel arrays, and the rearranging includes:

arranging, in the first raw color channel array, data elements corresponding to a red color channel in the instances of the pattern;

arranging, in the second raw color channel array, data elements corresponding to a first clear color channel in the instances of the pattern;

arranging, in the third raw color channel array, data elements corresponding to a second clear color channel in the instances of the pattern; and arranging, in the fourth raw color channel array, data elements corresponding to a third clear color channel in the instances of the pattern.

19. A circuit arrangement comprising:

a raw-image-conversion circuit configured to convert a full color image into a raw image, wherein the full color image is represented by a plurality of pixels, and each pixel is defined by a plurality of color values;

a rearranger circuit configured to rearrange data elements of the raw image into a plurality of raw color channel arrays, wherein: the data elements of the raw image are ordered according to instances of a pattern of color channels of a color filter array (CFA); the data elements of the raw image specify values of the color channels in the instances of the pattern; and each raw color channel array has data elements of one color channel of the color channels in the instances of the pattern; and one or more processor circuits configured to perform neural network inference on the plurality of raw color channel arrays.

20. The circuit arrangement of claim 19, wherein the plurality of raw color channel arrays includes first, second, third, and fourth raw color channel arrays, and the rearranger circuit is configured to:

arrange, in the first raw color channel array, data elements corresponding to a red color channel in the instances of the pattern;

arrange, in the second raw color channel array, data elements corresponding to a first green color channel in the instances of the pattern;

arrange, in the third raw color channel array, data elements corresponding to a second green color channel in the instances of the pattern; and arrange, in the fourth raw color channel array, data elements corresponding to a blue color channel in the instances of the pattern.

* * * * *